Dec. 10, 1963 J. W. FROST 3,113,665

DISPOSER FOR TRASH

Filed Dec. 4, 1961 5 Sheets-Sheet 1

INVENTOR.
JOHN W. FROST
BY
ATTORNEY

INVENTOR.
JOHN W. FROST
BY
[signature]
Attorney

INVENTOR.
JOHN W. FROST
BY [signature]
ATTORNEY

Dec. 10, 1963 | J. W. FROST | 3,113,665

DISPOSER FOR TRASH

Filed Dec. 4, 1961 | 5 Sheets-Sheet 4

INVENTOR.
JOHN W. FROST

BY [signature]

ATTORNEY

Dec. 10, 1963 J. W. FROST 3,113,665

DISPOSER FOR TRASH

Filed Dec. 4, 1961 5 Sheets-Sheet 5

INVENTOR.
JOHN W. FROST

BY John L. Diehl

ATTORNEY

United States Patent Office 3,113,665

Patented Dec. 10, 1963

3,113,665

DISPOSER FOR TRASH

John W. Frost, 512 Parkway Blvd., Appleton, Wis.

Filed Dec. 4, 1961, Ser. No. 157,329
5 Claims. (Cl. 206—19.5)

This invention relates to ash and waste receivers and more particularly to vacuum operated self disposing waste receivers for automotive vehicles and other vehicles.

Waste items that commonly occur in passenger vehicles such as cigarette and cigar ash and butts, paper napkins, fruit cores and the like constitute a problem in safe and expeditious disposal. The disclosed invention provides automotive vehicles with a safe and sanitary system of disposing of items of trash so as to lessen the frequency of occurrences in which occupants of vehicles cause litter to be strewn along highways and roadsides by ejecting trash from moving vehicles.

Conventional ash trays and litter bags in vehicles are unsuited for disposal of either of perishable food materials such as fruit cores and the like or of combustible items together with ignited materials such as discarded tobacco ash and butts. In each case there is a possibility that undesirable and obnoxious odors may permeate the passenger compartment of the vehicle.

The invention described herein provides a disposal system that eliminates certain undesirable features of currently available automotive disposal systems while retaining the desirable features found in available systems such as those of large disposal capacity and of convenient accessibility. The herein disclosed invention provides a depository receptacle that is easily accessible to occupants of a vehicle and is connected to a storage container which may be of greater volume than the receptacle and remotely located from the receptacle. Means is provided for transferring trash from the receptacle to the container. The container is at least partially exhausted of air by a source of reduced pressure and is hermetically sealed from the passenger compartment of the vehicle while a source of reduced pressure, which may be associated with a vehicle motor, is operating, and may be tightly and effectively sealed at other times. Materials which are burning when introduced into the container (such as cigar and cigarette stubs) cease burning and do not ignite other combustible materials in the container, due to the relative absence of air therein.

Existing vacuumized disposal systems are relatively less efficient in operation than the disclosed invention which operates in a manner superior to any system presently available. Specifically, the efficiency of such a disposal operation is dependent upon the magnitude of the pressure differential existing at the depository receptacle at the instant that the vacuum connection is completed. The more quickly the interconnection is completed the greater is the initial pressure differential at the depository receptacle immediately following completion of the interconnection and the greater is the capacity of the system to efficiently dispose of bulky items such as paper napkins, fruit cores and the like. The disclosed invention accomplishes the interconnection between the vacuum reservoir of the receiver or container volume and the depository receptacle with extreme rapidity, thus assuring highly efficient handling of disposed items.

The present invention represents an improvement over U.S. Patents 1,992,450, 2,461,815, 2,616,557, 2,656,039, 1,347,192 and 2,559,178 and over the inventions of my application Serial Number 609,861, filed September 14, 1956, entitled "Vehicle Ash and Waste Receiver," now Patent 2,891,662, and my copending application Serial Number 814,882, filed May 21, 1959, entitled "Waste Disposer," now U.S. Patent No. 3,011,627, of which this application is a continuation-in-part.

An object of this invention is, therefore, to provide a manually controlled vacuum operated waste disposal system of simple construction which may be conveniently installed and easily operated with great effectiveness, which is especially adapted for use in vehicles such as automobiles.

Another object of this invention is to provide a disposal system which will functionally dispose of bulky and variegated objects such as paper napkins and discarded food as well as liquids and particles (such as tobacco ash) and cigarette and cigar stubs.

A further object of this invention is to provide a receptacle that is easily installable in a vehicle and that is readily accessible for emptying and servicing and for reinstallation for further use.

Further objects will become apparent from the drawings and the following description wherein the applicability of the invention is illustrated without intention to thereby limit its scope to less than all of those equivalents which will be apparent to one skilled in the art.

In the drawings like reference numerals refer to like parts.

Figure 1:
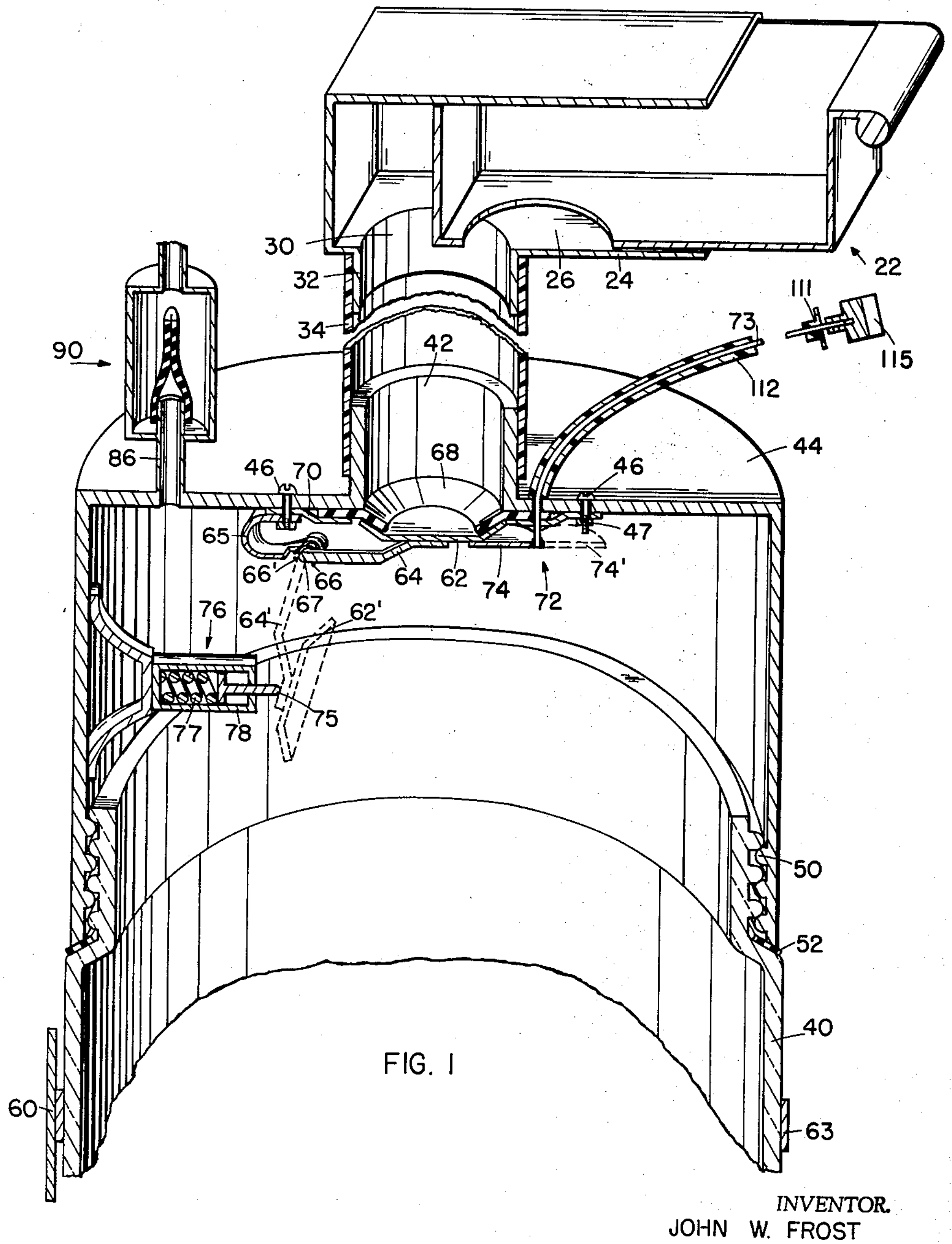
FIGURE 1 is a partially cut-away partially cross-sectional perspective view of one embodiment of the invention.

Referring now to FIGURE 1 there is shown a preferred embodiment of the invention wherein receptacle drawer 22 is slidably mounted in frame 24 with opening 26 in receptacle drawer 22 aligned with opening 30 in frame 24 when receptacle drawer 22 is in a closed position. Cylindrical flange 32 may be fixedly attached to frame 24 and may be press fitted into interconnecting duct receptacle 34 which is preferably made from a flexible and durable material such as, for instance, elastomeric plastics such as vinyl or polyethylene plastic, or from rubber, and is preferably of annular cross section with an inside diameter of about one to two inches. Member 34 connects receptacle 22 with container 40 by means of a press fitted connection on flange member 42. Flange member 42 is fixedly attached to cover 44 of container 40 by welding, as shown, or by any other suitable means. Cover 44 may be threadedly attached to container 40 as shown at 50. Gasket 52 may provide a seal between cover 44 and receiver 40 and may be made of any suitable material such as cork, rubber, or asbestos. Receiver 40 in the preferred embodiment is a glass jar of conventional manufacture with a capacity of about one quart to 5 gallons. Any other suitable metal, plastic or glass container which will not break when evacuated. Member 63 may extend from bracket 60 and encircle container 40 to support the device. Bracket 60 may be mounted on any convenient surface and preferably in an inconspicuous and easily accessible space such as the front of the fire wall in the case of an automobile. Any other convenient means of supporting the jar assembly may be used.

Flap valve member 62 is of rigid construction and is hingedly mounted on cover 44 by hinge 64. Hinge pin 65 of hinge 64 passes through spiral spring 66 which acts to close flap member 62 into contact with annular seal member 68. Member 68 may be made of any one of various materials which posses elastomeric properties such as rubber or plastic or it may be made of other flexible material such as of metal. Member 68 may be fastened to cover 44 by retaining ring 70 and bolts 46 passing through cover 44 and fixedly fastened by threaded nuts 47.

Flap valve member 62 may be held in the closed position by latch 72 which may comprise shaft 73 extending through cover 44 and eccentrically attached to disc member 74 positioned normal to shaft 73 and intercepting flap member 62 so as to hold flap member 62 in a closed position when member 74 is rotated to a position pointing radially inward toward the center of container 40. Shaft 73 passes through a hole in cover 44 which may be sealed by a soft rubber or plastic plug (not shown for simplicity) of conventional design. Shaft 73 may extend through cable casing 112 constructed with its bore sufficiently large to enable wire 73 to be rotatably moved within cable casing 112. At the dash panel (not shown) of the vehicle, the end flange 111 of the cable may be fixedly fastened to the panel and shaft 73 may be attached to a control knob 115 which may be rotated to operably turn shaft end member 74.

Air which may be removed from container 40 by a source of vacuum such as internal combustion engine or a vacuum pump may pass out through tube 86 and thence through check valve 90, which may have the form of a Bunsen valve or Thomas beer vent, as shown.

As the pressure in container 40 is reduced, the portion of annular seal member 68 which is adjacent the angularly upward extending peripheral portion 63 of flap valve member 62 is drawn tightly against portion 63 (as not shown in FIGURE 1) due to the increase in pressure differential, if a portion of member 68 contacts portion 63 annularly, as shown in FIGURE 1, prior to the beginning of the increase in differential.

By rotating wire shaft 73, member 74 may be rotated into the position shown by broken lines at 74' whereupon member 62 is released and is driven downward, toward container 40, into the position indicated at 62', by the greater pressure in receptacle tube 34 than in container 40.

As member 62 is driven downward, the annular seal member 68 which is preferably both flexible and resilient reassumes the shape shown in FIGURE 1 and member 62 may strike plunger 75 of shock absorbing device 76. Plunger 75 may compress spring 77 within housing 78 to absorb the momentum and inertia of member 62. The force thus stored in spring 77 may then drive plunger 75 outward to force member 62 hingedly upward and thus aid spiral spring 66 in causing member 62 to return to the closed position shown in FIGURE 1.

It is essential in most cases that the flap member contact the annular seal member only relatively very lightly when it initially closes and is latched closed in order that the spring forces which cause the flap valve member to close and latch against the action of the seal member need not be excessive. As hereinafter more fully described, the sealing force and sealing area between the seal member and flap valve member are increased in proportion to the increase in pressure differential across the flap valve member. Thus, the sealing force becomes great when it is necessary that it be relatively large to prevent leakage resulting from a high pressure differential.

Receptacle 40 may have any shape, including those described in my Patent 2,801,662 and, by suitable modification to provide a duct leading from flap member 62, may be located at any suitable place in a vehicle as described in said patent in connection with FIGURES 2, 24, 25, 26, 27 and 28 thereof.

The source of reduced pressure may be either a portion of an internal combustion engine as hereinbefore described or may be a portion of a gas turbine engine or a mechanism for providing a reduced pressure which may be associated with either such type of engine.

It may be noted that, as shown in FIGURE 1, the inner portion of member 68, which seals against portion 63 of member 62, extends downwardly at an angle of about 45° and portion 63 extends upwardly at an angle of about 45°. This angle may be from about 2° to about 85°.

Figure 2:
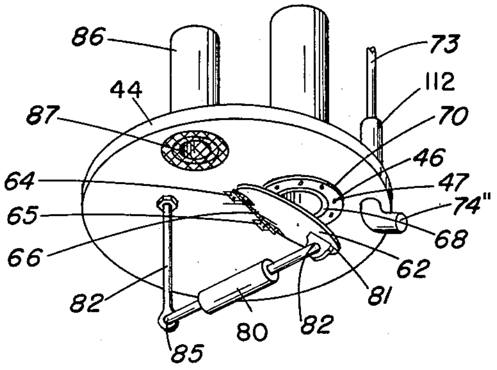
FIGURE 2 is a perspective view of a portion of a modification of the device of FIGURE 1.

In FIGURE 2 is shown a pivotedly connected pneumatic dashpot comprising a piston and cylinder which may be used in place of device 76. Dashpot 80 may be of conventional design with a quick opening check valve in one end arranged so that flap member 62 may open rapidly and be caused to close more slowly. As shown dashpot 80 consists of a cylinder perforated with relatively large openings throughout a portion of the cylinder length with one or relatively small orifices in the cylinder near one end thereof arranged so as to retard the motion of flap member 62 in seating upon seal member 68 by forcing air within the cylinder to flow through small orifices with high frictional resistance.

Dashpot 80 may be pivotedly connected at 85 to the lower end of vertical rod 82, shown as a rigid support rod affixed to cover 44 by threaded nuts on the inner and outer sides respectively of cover 44. Dashpot 80 is free to rotate around pivot 85 to accommodate movement of the apparatus caused by movement of flap member 62 opening and closing.

The closing movement of flap member 62 may be thus retarded to permit articles partially remaining in receptacle 34 to be completely transported into container 40 before flap member 62 moves to a fully closed position. Flap member 62 may be closed by spiral spring 66 against a counter force of a few ounces to a few pounds of air pressure arising from the existence of differential air pressure between duct 34 and 40. It is desirable to delay the closing movement of flap member 62 to enable articles partially remaining in connecting duct 34 to be cleared of flap member 62 when it closes. Items such as uncrumpled paper napkins and the like undergo rapid movement in duct 34, but move with lessened velocity when they are partially within container 40 and responding to smaller forces resulting from lesser pressure differentials acting upon smaller areas, and it is desirable to allow bulky items such as these sufficient time to move completely into container 40 before flap member 62 fully closes. Latch member 74'' differs from member 74 in that, instead of being a disk; it is an L-shaped member, being shown in a position corresponding to 74', whereby member 62 is released or unlatched, due to rotation of shaft 73 to which it is connected.

Screen 87 may be provided across the opening to tube 86 and may be made of woven wire, fabric or other material capable of preventing particles of abrasive grit from passing into the vehicle engine or other vacuum source. Screen 87 may be fastened to cover 44 by staples, solder, adhesive or other suitable means.

Figure 3:
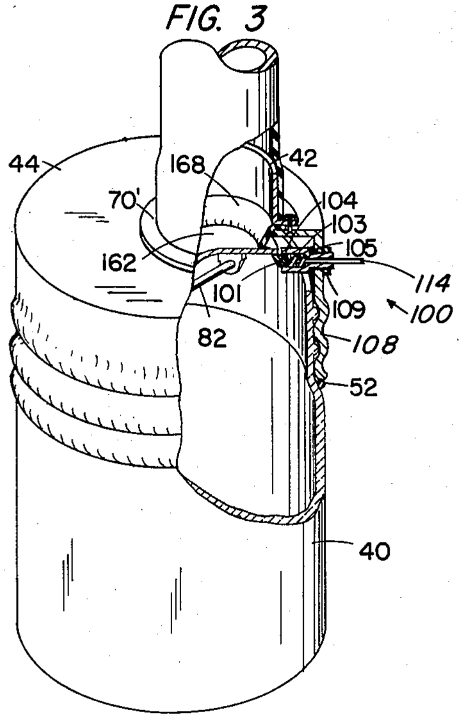
FIGURE 3 is a partially cut-away perspective view of a modification of the embodiment of FIGURE 1.
Figure 4:
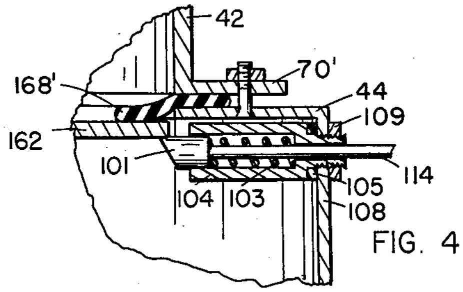
FIGURE 4 is a cross-sectional fragmentary view of the embodiment of FIGURE 3 under different conditions.

Referring now to FIGURES 3 and 4, there is shown an embodiment wherein a latch indicated generally as 100 holds flap valve member 162 in contact with annular seal member 168. Member 162 may have a planar upper surface as shown and member 168 may be nearly planar as shown. Member 168 may be held in place by flange 78' extending from duct portion 42', which may be bolted to cover 44 as shown. Latch 100 may comprise a bar 101 which may be slidingly received in housing 104 and may be attached to wire 114. Bar 101 may have its outer end beveled as shown and may be biased outwardly by compression coil spring 103 which may be contained in housing 104. Housing 104 may be provided with a threadedly extending portion, which may extend through flange 108 which depends from cover 44, and which may be engaged by a nut 109 to hold the housing in place. Gasket 105 may be provided between housing 104 and flange 108 and wire 114 may extend through an aperture in the extending portion of the housing, as shown. Wire 114 may extend to the dashboard of a vehicle, where it may be attached to a knob which may be pulled by an occupant of the vehicle.

To operate the latch, wire 114 is pulled; bar 101 is thereby withdrawn into housing 104, against the force exerted by spring 103, until member 162 can swing downwardly past the end of the bar.

Member 168 is shown in FIGURE 3 in the form it has when member 162 is latched closed and the pressure differential across member 162 is nil or insignificant, as is the case when the source of vacuum is not operating or when it is operating and member 162 has just been opened, thus equalizing the pressure in the receptacle and the container, and then closed. After a substantial difference in pressure has been provided, by reducing the pressure in container 40, member 168 (being resilient and deformable) is drawn into the position shown at 168' in FIGURE 4, thus greatly increasing the sealing area and sealing force.

Figure 6:
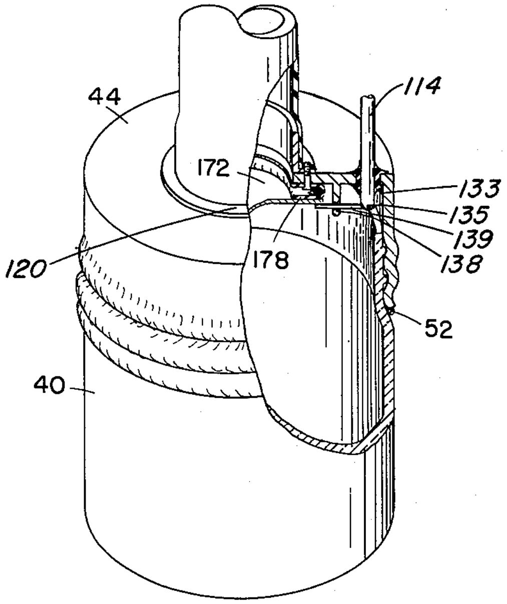
FIGURE 6 is a view corresponding to FIGURE 5, of the embodiment of FIGURE 5 under different conditions.
Figure 5:
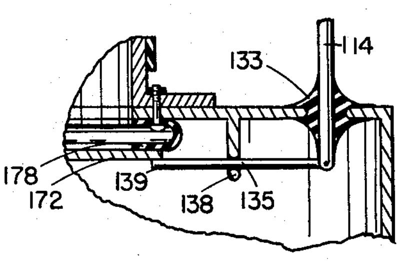
FIGURE 5 is a cross-sectional fragmentary view of a portion of another embodiment.

In FIGURES 5 and 6, annular seal member 178 has the form of a letter U on its side, with the legs of the U extending inwardly. In modifications not shown for simplicity they may extend outwardly, upwardly or downwardly. Member 178 engages a flap valve member 172 having a substantially planar upper surface. In FIGURE 5, member 178 is not subjected to a pressure differential; in FIGURE 6 it is subjected to a pressure differential and is drawn into sealing contact with member 172 over a wide area.

Throughout this specification I have in some cases referred to vacuum but in most part referred to reduced pressure, it being my intent to make clear throughout that an absolute or total vacuum or a vacuum approaching an absolute or total vacuum such as one in which there is a remaining pressure of twenty millimeters or less of mercury is not at all necessary for the operation of my system; it being necessary only that air pressure be reduced within the system to the extent hereinbefore described. When utilized with a larger engine than a 90 horsepower engine, such as for example a 270 horsepower engine, the "recovery time" of the apparatus is obviously much lower.

In FIGURES 5 and 6, lever 114 extends through the cover of the container, being sealed thereto and pivotally mounted therein by elastomeric grommet member 133 which may frictionally engage either the cover or the lever or both, or may be vulcanized to either. Pin 139 may be slidably mounted in bracket 138 and pivotally connected to lever 114 at one end; the other end may extend laterally under an edge of flap valve member 172 to hold member 172 closed.

To release the latch and thereby permit member 172 to open downward into the container, the upper end of lever 114 may be pressed sidewise to the left to withdraw the pin from underneath member 172.

As before mentioned, the flexible resilient annular seal member may be of thin metal.

The seal member modification shown in FIGURES 5 and 6 may be fixedly attached to either flap member 162 or cover 44. The preferred embodiment shows the seal member fixedly attached to cover 44 thereby permitting debris to slide over the upper surface of flap member 162 without being obstructed as is the case if the seal member is attached thereto.

Figure 7:
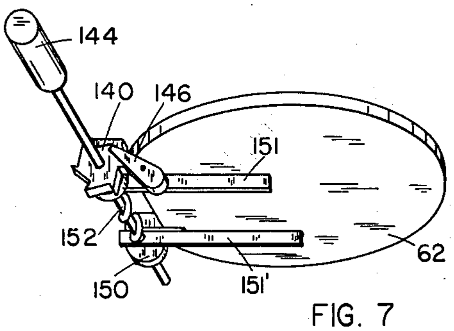
FIGURE 7 is a perspective view from below of a portion of a modification of the embodiment of FIGURE 2.

In FIGURE 7 is shown a modification of the dashpot arrangement of FIGURE 2. Hinge members 150, 150', 151, and 151' are mutually interconnected by hinge pin 152 which extends into cylinder 144. Ratchet 140 and a vane (not shown) which is located within cylinder 144 are fixedly connected to hinge pin 152. The vane rotates within oil filled cylinder 144 when ratchet 140 turns hinge pin 152 as flap member 62 is closed. The motion of vane 142 through the cylinder causes the oil therein to resist movement of the vane by frictional force and retard the motion of flap member 62 fixedly connected thereto. Pawl 146 is pivotally affixed on flap member 62 as shown and is weighted so that the pointed end of pawl 146 contacts ratchet 140 when flap member 62 is open. As flap member 62 begins to close, pawl 146 engages ratchet 140 and rotates the vane as described. During opening of flap member 62, pawl 146 contacts ratchet 140 but cannot engage therewith so the opening motion of member 62 is not delayed.

Figure 8:
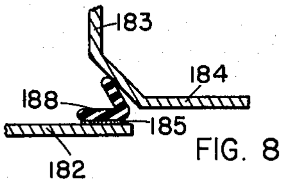
FIGURE 8 is a fragmentary cross-sectional schematic view of another embodiment.

Referring now to FIGURE 8, there is shown a cover member 184 which may be a cover for a container such as container 40, wall 183 of a receptacle or receptacle duct into which trash may be placed, flap valve member 182 which may hingedly open downwardly into the container to permit trash to move from the receptacle into the container and flexible resilient annular seal member 188 affixed to the peripheral edge of member 182 by adhesive 185.

Although in the figures previously described and described hereinafter, the flap valve member is shown and described as hingedly opening downward, it may hingedly open sidewise or upwards if the receptacle and container are suitably oriented. Thus, it is generally not desired that the receptacle be below the valve and the container above the valve so that the valve would open upwardly but this arrangement may be utilized. In many instances it may be desirable for the receptacle and container to be laterally oriented so that the valve opens sidewardly into the container and trash moves laterally from the receptacle into the container when the valve is opened. The receptacle of which member 183 is a wall may be connected or connectable with a tray as described in conjunction with FIGURE 1, or users of the device may place trash directly into said receptacle.

Figure 9:
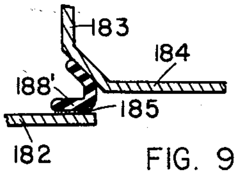
FIGURE 9 is a view corresponding to FIGURE 8, of the embodiment of FIGURE 8 under different conditions.

When no differential pressure or only a slight differential pressure exists between the receptacle and the container, member 188 has the form shown in FIGURE 8 with its upper edge lightly contacting the interior wall surface of the wall between wall 183 and cover 184. When a differential pressure exists between the receptacle and the container, the pressure in the receptacle forces member 188 into the position shown at 188' in FIGURE 9, thus increasing the sealing area and sealing force of member 188, and thus effectively preventing leakage despite the increased tendency of air to pass through the seal due to the increase in pressure differential.

Figure 10:
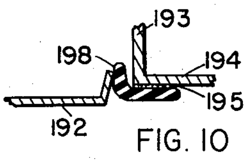
FIGURE 10 is a fragmentary cross-sectional schematic view of another embodiment.
Figure 11:
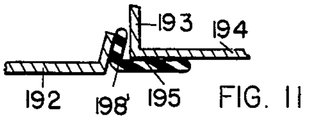
FIGURE 11 is a view corresponding to FIGURE 10, of the embodiment of FIGURE 10 under different conditions.

Referring now to FIGURES 10 and 11, cover 194 corresponds to cover 184 and wall 193 corresponds to wall 183. Attached to cover 194 by adhesive 195 is flexible resilient annular seal member 198.

The flexible, resilient annular seal member described in the figures hereinbefore discussed and in connection with FIGURES 10, 11, 12 and 13 is preferably of a somewhat elastomeric material such as synthetic rubber, for example, GR–S or GR–N or polychoroprene sold under the tradename neoprene or polysulfide rubber sold under the trademark Thiokol.

As shown in FIGURE 10, when flap valve member 192, which is adapted to hingedly open downward, is in closed position and no differential exists between the receptacle of which member 193 is a wall and the container of which member 194 is a cover, the outer peripheral edge of member 192 only lightly contacts the upper peripheral inner surface of member 198. However, as shown in FIGURE 11, when the pressure differential is great, the pressure in the receptacle forces member 198 into the position shown at 198′ in FIGURE 11 to improve the seal between members 198 and 192 and thus prevent leakage past the seal.

Figure 13:
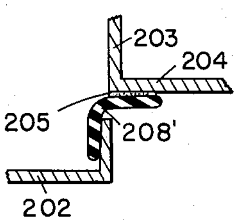
FIGURE 13 is a view corresponding to FIGURE 12, of the embodiment of FIGURE 12 under different conditions.
Figure 12:
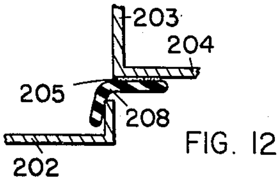
FIGURE 12 is a fragmentary cross-sectional schematic view of another embodiment.

As shown in FIGURES 12 and 13, receptacle member 203 and container cover 204 may correspond respectively to members 193 and 194. Flexible, resilient, annular seal member 208 may be attached to member 204 by adhesive 205 and when flap valve member 202 is in the closed position as shown in FIGURE 12 and little or no pressure differential exists between the receptacle and the container, the upper inner peripheral edge of member 202 lightly contacts member 208. When a pressure differential exists between the receptacle and the container, member 208 is forced into the position shown at 208′, thereby increasing the contact area and pressure between the members.

Figure 14:
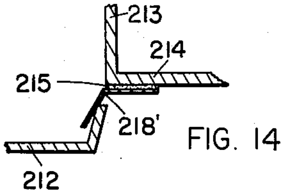
FIGURE 14 is a fragmentary cross-sectional schematic view of another embodiment.
Figure 15:
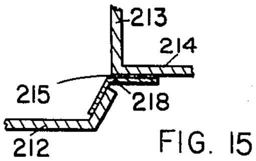
FIGURE 15 is a view corresponding to FIGURE 14, of the embodiment of FIGURE 14 under different conditions.

Referring now to FIGURES 14 and 15, receptacle wall 213 and container cover 214 may correspond to members 203 and 204. Flexible, resilient, annular seal member 218 of metal may be attached by adhesive or solder 215 to member 214. With flap valve member 212, which is adapted to hingedly open downward, in the closed position as shown in these figures, and with little or no pressure differential between the receptacle and the container, the inner downwardly extending portion of member 218 is lightly contacted by the upper peripheral edge of member 212 to provide a light seal in between. When a pressure differential exists, member 218 is forced by the pressure in the receptacle into the position shown at 218′ to increase the effectiveness of the seal between the members 212 and 218.

Figure 16:
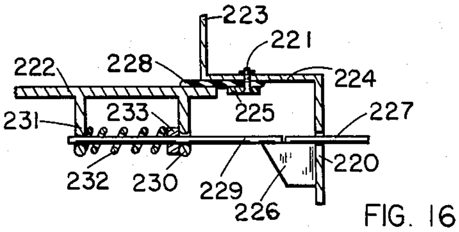
FIGURE 16 is a fragmentary cross-sectional schematic view of latch means, in closed position.
Figure 17:
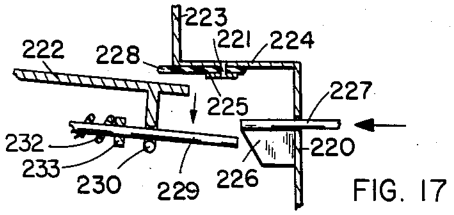
FIGURE 17 is a view corresponding to FIGURE 16, of the latch means of FIGURE 16 in open position.

Referring now to FIGURES 16 and 17, flap valve member 222 is adapted to seal the receptacle defined by receptacle wall 223 from the container defined by container wall 220 and container cover 224, by contact against flexible, resilient annular seal member 228, which is attached to cover 224 by retainer ring 225 and rivets 221. Slidably extending through walls 220, there may be provided latch operating pin 227. Slidably mounted in brackets 230 and 231 which are attached to the underside of flap valve member 222, is latch pin 229 which extends to rest against the upper surface of latch retainer member 226, being biased outwardly by compression spring 232 acting against collar 233 which is attached to pin 229. Spring 232 may be seated on bracket 231. When latch operating pin 227 is slidably pushed from outside the container, in the manner shown by the horizontal arrow in FIGURE 17, pin 229 is pushed backward against the biasing action of spring 232 until it no longer rests upon latch retainer member 226, whereupon, due to the pressure in the receptacle being greater than that in the container, flap valve member 222 is driven downward and the end of pin 229 is driven downward off the lip of member 226 as shown by the downwardly extending arrow in FIGURE 17.

Figure 18:
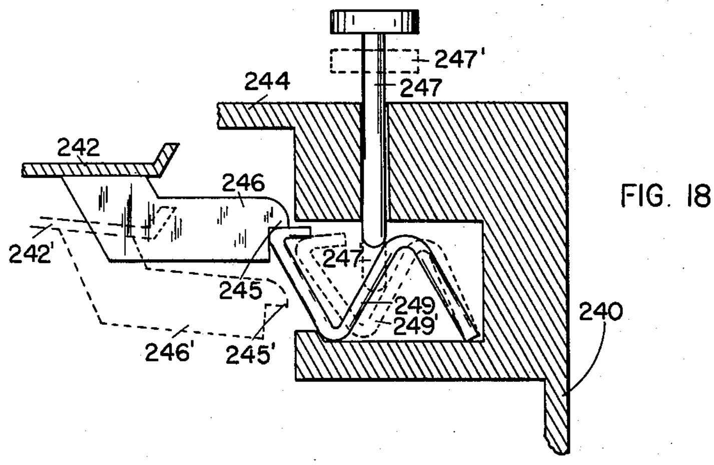
FIGURE 18 is a fragmentary cross-sectional schematic view of latch means.

Referring now to FIGURE 18, flap valve member 242 may be adapted to serve as a closure or valve between a receptacle above member 242, the receptacle not being shown for simplicity, and a container disposed generally below member 242, the container being defined by cover 244 and wall 240. Retained within a suitable recess within wall 240, there may be provided spring latch member 249. Extending into contact with member 249, there may be provided latch operating member 247 slidably extending through a suitable hole in cover 244. Member 242 may be provided with a suitable latching member 246 having a projection or lip 245 to engage a latching portion of member 249 near one end thereof and prevent downward movement of member 242.

When latch operating member 247 is slidably moved, by manual operation of other suitable operation into the position shown by broken lines 247′, member 249 is forced into the position shown at 249′ and lip 245 is released so that if a suitable pressure differential exists between the receptable and the container, the pressure in the receptacle will drive member 242, and consequently member 246, downward so that immediately after release they occupy the position shown by broken lines 242′ and 246′ with lip 245 in the position shown at 245′.

Figure 19:
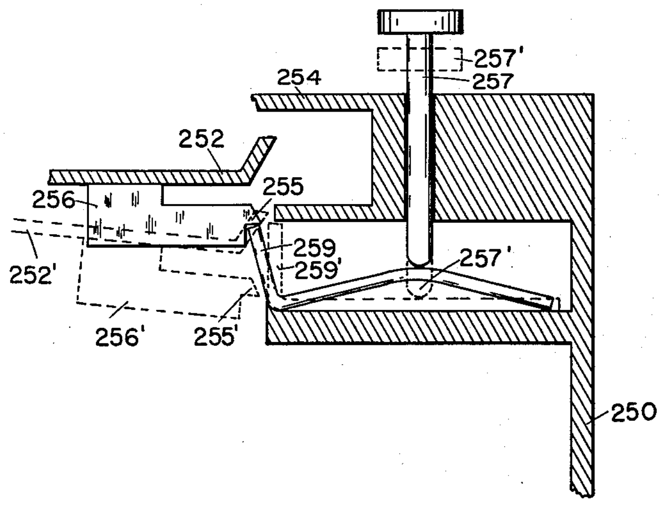
FIGURE 19 is a fragmentary cross-sectional schematic view of latch means.

Referring now to FIGURE 19, members 252, 254, 250, and 256 correspond respectively to members 242, 244, 240 and 246. Extending downwardly through a suitable aperture in cover 254 there may be provided latch operating member 257, and within a suitable recess extending from the interior surface of wall 250, there may be provided a latch operating spring member 249. Extending from member 256 is lip 255 which engages the upper end of member 249.

When member 257 is forced into the position shown by broken lines 257′, member 249 is forced into the position shown by broken lines 249′ thus releasing member 255 so that immediately after such release, members 252, 256 and 255 may be forced to the position shown by broken lines 252′, 256′, and 255′ by the downward driving force of a greater pressure in the receptacle than in the container.

It may thus be seen that the invention is broad in scope and is not to be limited excepting by the claims.

Having thus disclosed my invention, I claim:

1. In a device of the type described, the combination of:

a compartment adapted to contain humans,
a substantially enclosed space inadapted to contain humans spaced apart from said compartment,
a source of reduced air pressure disposed in said space,
a closed container communicating with said source, a trash-receiving receptacle disposed within said compartment,
duct means providing a communicating passage between said trash-receiving receptacle and said closed container,
a resilient flexible annular seal member in said duct means,
a flap valve member in said duct means,
said flap member in closed position, sealable to the walls of said duct means by said seal member,
said seal resiliently movable to seal between said flap valve member and said walls in response to lower-than-atmospheric pressure in said container to provide greater pressure in said receptacle than in said container,
latch means holding said flap valve member closed,
said latch means operable to release said flap valve member rapidly,
said flap valve member hingedly mounted to hingedly open toward said container in response to release of said latch,
said flap valve member being driven open by the greater pressure in said receptacle than in said container.

2. In the combination of claim 1, said annular seal member having a cross-sectional configuration of substantially U form with the legs of said U extending inwardly.

3. In the combination of claim 1, said annular seal member being of substantially planar configuration.

4. In the combination of claim 1, said annular seal member being attached at its outer periphery to said walls and having an unsupported inwardly extending portion to constitute an overhanging lip inclined toward said container, said flap valve member having a peripheral extremity extending angularly upward from said container when said flap member is in closed position such that said overhanging lip contacts the inner surface of said peripheral portion.

5. The combination of claim 1, wherein a dashpot is operably attached to said flap valve member to retard its closing movement.

No references cited.